US012487579B2

(12) United States Patent
Hess et al.

(10) Patent No.: US 12,487,579 B2
(45) Date of Patent: Dec. 2, 2025

(54) 3D PRINT PORTAL TO ASSIST IN REVISING, REVIEWING, AND APPROVING 3D PRINTABLE FILES

(71) Applicants: Ryan Hess, Boulder, CO (US); Fred Herold, Boulder, CO (US); Steven A. Nelson, Boulder, CO (US); Gary Turner, Boulder, CO (US); Patrick Gannon, Boulder, CO (US); Jeanette Wall, Boulder, CO (US); John Gramlich, Boulder, CO (US)

(72) Inventors: Ryan Hess, Boulder, CO (US); Fred Herold, Boulder, CO (US); Steven A. Nelson, Boulder, CO (US); Gary Turner, Boulder, CO (US); Patrick Gannon, Boulder, CO (US); Jeanette Wall, Boulder, CO (US); John Gramlich, Boulder, CO (US)

(73) Assignee: Ricoh Company, LTD., Tokyo (JP)

( * ) Notice: Subject to any disclaimer, the term of this patent is extended or adjusted under 35 U.S.C. 154(b) by 0 days.

(21) Appl. No.: 17/196,842

(22) Filed: Mar. 9, 2021

(65) Prior Publication Data

US 2022/0291660 A1    Sep. 15, 2022

(51) Int. Cl.
*G05B 19/4099*    (2006.01)
*G06F 21/44*    (2013.01)

(52) U.S. Cl.
CPC ......... *G05B 19/4099* (2013.01); *G06F 21/44* (2013.01); *G05B 2219/49023* (2013.01)

(58) Field of Classification Search
None
See application file for complete search history.

(56) References Cited

U.S. PATENT DOCUMENTS

| 8,639,484 | B2 * | 1/2014 | Sun | G06F 30/00 703/11 |
| 8,735,773 | B2 * | 5/2014 | Lang | A61F 2/28 219/121.72 |
| 8,818,544 | B2 * | 8/2014 | Nehme | B29C 64/393 705/400 |
| 8,888,480 | B2 * | 11/2014 | Yoo | B33Y 40/00 425/375 |
| 9,862,149 | B2 * | 1/2018 | Wang | B29C 64/393 |
| 10,143,555 | B2 * | 12/2018 | DeFelice | A61F 2/30942 |

(Continued)

FOREIGN PATENT DOCUMENTS

WO    WO-2018069736 A1 *    4/2018    ............. A61B 34/10

OTHER PUBLICATIONS

Nelson, U.S. Appl. No. 17/688,808, filed Mar. 7, 2022, Non-Final Rejection, Feb. 7, 2023.

(Continued)

*Primary Examiner* — Jason Lin
(74) *Attorney, Agent, or Firm* — Hickman Becker Bingham Ledesma LLP (57) ABSTRACT

A 3D portal facilitates revision, review, and approval of 3D printable files prior to printing. A collection of one or more 3D printable files of an object to be printed is revised and reviewed until a version of the collection that is not only accurate but optimized for printing, is finalized. Healthcare professional users and application engineer users are able to communicate, collaborate, and plan requirements for the print.

20 Claims, 6 Drawing Sheets

(56) References Cited

U.S. PATENT DOCUMENTS

| | | | |
|---|---|---|---|
| 10,275,548 B1 | 4/2019 | Kodali | |
| 10,338,567 B2* | 7/2019 | Guimbretiere | G05B 19/4099 |
| 10,399,374 B2* | 9/2019 | Kritchman | B41M 7/0027 |
| 10,433,858 B2* | 10/2019 | Zubrod | A61B 18/1442 |
| 10,736,698 B2 | 8/2020 | Bohl | |
| 10,765,658 B2* | 9/2020 | Estey | A61P 25/00 |
| 10,902,944 B1* | 1/2021 | Casey | G16H 50/20 |
| 11,033,336 B2 | 6/2021 | Bohl | |
| 11,112,770 B2* | 9/2021 | Roh | G16H 50/50 |
| 12,133,803 B2 | 11/2024 | Casey | |
| 2002/0059049 A1* | 5/2002 | Bradbury | G16H 40/67 703/11 |
| 2007/0162295 A1 | 7/2007 | Akhtar | |
| 2008/0187895 A1 | 8/2008 | Sakezles | |
| 2014/0122027 A1 | 5/2014 | Andreiko | |
| 2014/0156053 A1* | 6/2014 | Mahdavi | B29C 64/112 700/119 |
| 2015/0120806 A1* | 4/2015 | Lippincott | H04L 63/08 709/203 |
| 2016/0022370 A1 | 1/2016 | Pavlovskaia | |
| 2017/0157853 A1* | 6/2017 | Gallinaro | B33Y 10/00 |
| 2017/0218660 A1* | 8/2017 | Muchna | E05B 47/026 |
| 2017/0235848 A1 | 8/2017 | Van Dusen et al. | |
| 2019/0016057 A1* | 1/2019 | Manners | B29C 64/393 |
| 2019/0102815 A1* | 4/2019 | Norman | G06Q 30/06 |
| 2022/0020223 A1* | 1/2022 | Van Bael | G06T 11/60 |
| 2022/0254466 A1 | 8/2022 | Hwang | |
| 2023/0014384 A1 | 1/2023 | Cordonnier | |
| 2023/0285081 A1 | 9/2023 | Wagner | |

OTHER PUBLICATIONS

Nelson, U.S. Appl. No. 17/688,795, filed Mar. 7, 2022, Non-Final Rejection, Feb. 12, 2025.

\* cited by examiner

3D PRINT PORTAL TO ASSIST IN REVISING, REVIEWING, AND APPROVING 3D PRINTABLE FILES

FIELD

The present application relates generally to printing and, more specifically, to a 3D print portal to assist in revising, reviewing, and approving 3D printable files.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Technology for healthcare is a rapidly evolving market. Within this market, one of the quickest growing segments is the creation of patient-specific tools that help healthcare professionals personalize care to each individual. An example patient-specific tool is a 3D model, which is an exact replica of a specific part of a patient on which a surgeon will be operating. 3D models are beneficial in a number of ways. For example, surgeons can use the 3D models to show patients exactly what will be operated on so that the patients are well informed. In addition, surgeons can use these models to plan their surgery and achieve better results including less time spent in operating rooms and less chance for errors. Yet, creating and obtaining a printed anatomical part or any object is often a time-consuming and expensive process. For example, 3D printable files containing errors lead to print failures. Healthcare professionals may not be trained to identify these errors prior to submitting the 3D printable files for printing. Also, surgeons may decide to print a different part or a different portion of a part, such as a cutaway version of a part. Printing a complex 3D object, such as an anatomical part, may already take hours to several days to complete. Reprinting adds more time and expense to complete the print process. Lack of a solution to ensure that 3D printable files are accurate and optimized for printing wastes time, time, and computing resources that would otherwise be required in reprinting.

SUMMARY

The appended claims may serve as a summary. In one aspect, a method is provided. The method comprises receiving, by a manager computer, a request including print data of an object from a requester computer; associating, by the manager computer, the print data with an initial version of a collection of one or more 3D printable files for printing the object; electronically storing, by the manager computer, the print data and the initial version of the collection of the one or more 3D printable files in a data repository; accessing, by the manager computer, the initial version of the collection of the one or more 3D printable files from the data repository for a reviewer computer; receiving, by the manager computer, a modified version of the collection from the reviewer computer, wherein the modified version of the collection differs from the initial version of the collection of the one or more 3D printable files; electronically storing, by the manager computer, the modified version of the collection in the data repository; accessing, by the manager computer, the modified version of the collection of the one or more 3D printable files from the data repository for the requester computer for approval; receiving, by the manager computer, an approval indication for a particular version of the collection of the one or more 3D printable files from the requester computer, wherein the particular version of the collection is a version from a plurality of versions of the collection for printing the object that is electronically stored in the data repository; in response to receiving the approval indication, causing to 3D print the object according to the particular version of the collection of the one or more 3D printable files.

The aforementioned approaches may also be implemented by one or more computer-implemented processes and non-transitory computer-readable media that store instructions which, when processed by one or more processed, implement the approach.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments. Various embodiments are described hereinafter in the following sections:

I. OVERVIEW
II. ARCHITECTURE OVERVIEW
  A. NETWORK
  B. REQUESTING CLIENT COMPUTING DEVICE
  C. REVIEWING CLIENT COMPUTING DEVICE
  D. DATA REPOSITORY
  E. MANAGER SERVER COMPUTING DEVICE
III. EXAMPLE EVENT FLOW
IV. PROCEDURAL OVERVIEW
V. IMPLEMENTATION EXAMPLES

I. Overview

According to various embodiments, computer-implemented apparatuses, methods, and systems are provided for a 3D portal that facilitates revision, review, and approval of 3D printable files prior to printing. A collection of one or more 3D printable files of an object to be printed is revised and reviewed until a version of the collection, that is not only accurate but optimized for printing, is finalized. Healthcare professional users and application engineer users are able to communicate, collaborate, and plan requirements for the print.

Technical benefits include improved performance and responsiveness of 3D printers. For example, a 3D printable file that is not optimized (e.g., file size much larger than required) requires additional computer processing resources to process the 3D printable file. In some instances, a 3D printable file having a large size cannot even be handled by a 3D printer. Furthermore, there may issues transferring such large files over a network. Optimized 3D printable files thus reduce network bandwidth and computer processing resources, such as CPU usage and memory, resulting in improved machine efficiency.

II. Architecture Overview

Figure 1:
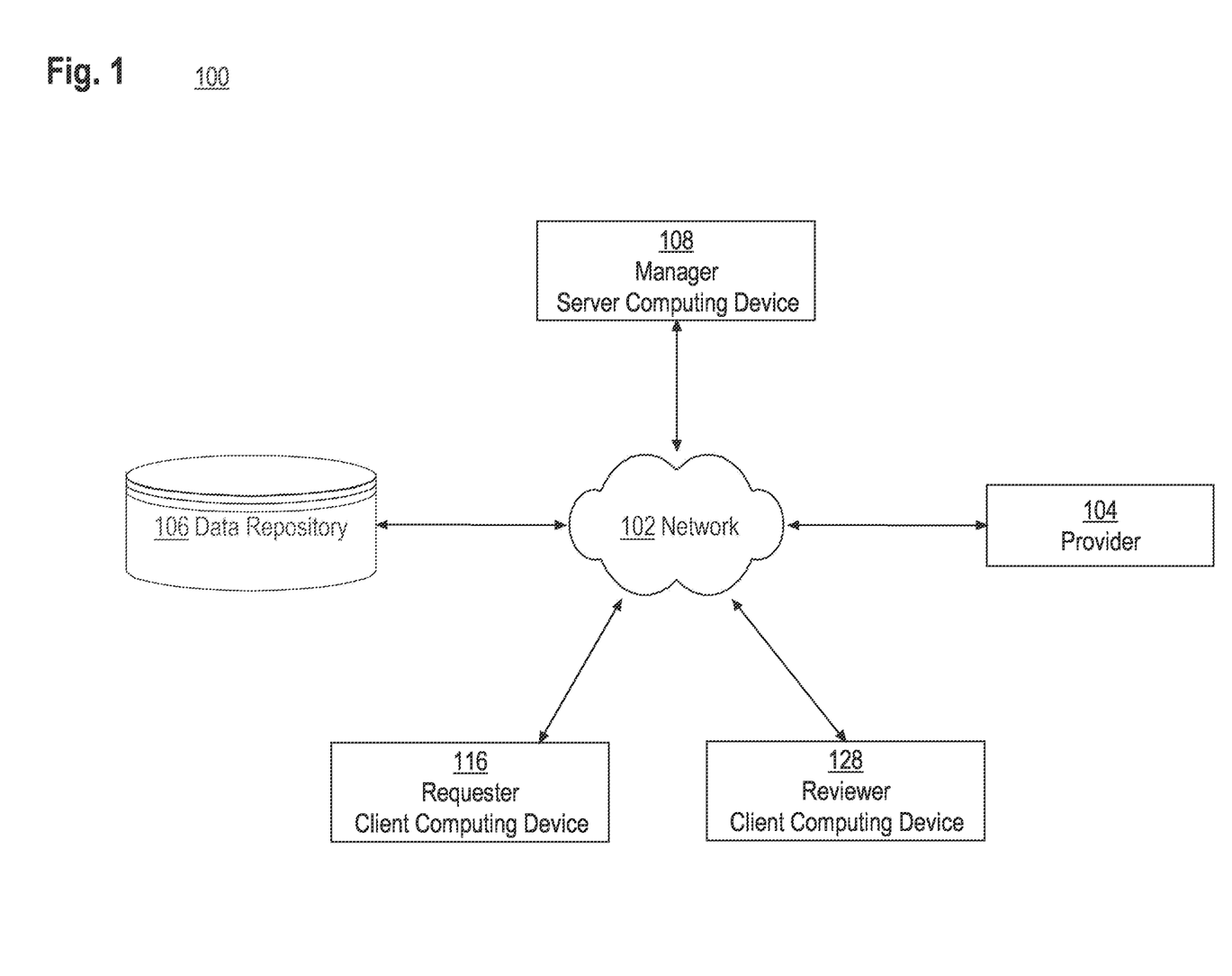
FIG. 1 depicts a networked computer system, according to an embodiment.

FIG. 1 depicts a networked computer system 100, according to an embodiment. In an embodiment, the computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" or "computing device" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" or "a computing device" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C, or any other suitable programming environment.

Although components of FIG. 1 are depicted and described herein in one particular configuration, this is done for explanation purposes only and the components of FIG. 1 may be configured in any manner. In the example of FIG. 1, the networked computer system 100 includes one or more marketplace providers 104 (individually and collectively), a data repository 106, a manager server computing device 108, and one or more requester client computing devices 116 (individually and collectively), and one or more reviewer client computing devices 128 (individually and collectively), all of which are communicatively coupled via a network 102.

FIG. 1 depicts only one of many possible arrangements of components configured to execute the programming described herein. Other arrangements may include fewer or different components, and the division of work between the components may vary depending on the arrangement. For example, as described below, image viewing, segmenting Digital Imaging and Communications In Medicine (DICOM) images and generating 3D printable files from segmented DICOM images may be performed on a requester client computing device 116, while viewing and modifying 3D printable files may be performed on a reviewer client computing device 128. However, image viewing, segmenting DICOM images, generating 3D printable files from segmented DICOM images, and/or viewing and modifying 3D printable files may be performed on the manager server computing device 108, in an embodiment. Embodiments are described here in the context of the DICOM standard for purposes of explanation, but embodiments are not limited to the DICOM standard and are applicable to other standards.

A. Network

Network 102 broadly represents a combination of one or more local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All components described herein may be configured to connect to the network 102 and the disclosure presumes that all components of FIG. 1 are communicatively coupled via network 102. The various components depicted in FIG. 1 may also communicate with each other via direct communications links that are not depicted in FIG. 1 for purposes of explanation.

B. Requester Client Computing Device

A requester client computing device 116 of FIG. 1 may be implemented by any type of computing device. Example implementations of a requester client computing device 116 include, without limitation, workstations, personal computers, laptop computers, tablet computers, personal digital assistants (PDAs), cellular telephony devices and any type of mobile devices.

Figure 2A:
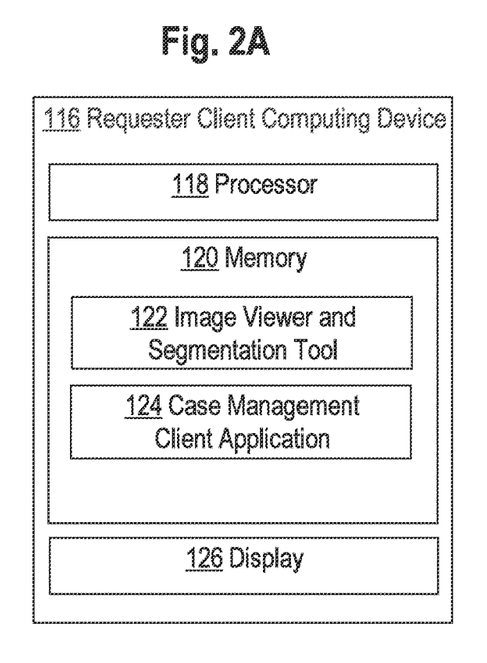
FIG. 2A depicts an example requester client computing device, according to an embodiment.

FIG. 2A depicts an example requester client computing device 116. The requester client computing device 116, operated by a healthcare professional user, includes a processor 118, memory 120 that includes an image viewer and segmentation tool 122 and a case management client application 124 executed by the processor 118, and a display 126.

The image viewer and segmentation tool 122 allows the healthcare professional user of the requester client computing device 116 to view and segment medical images and to generate 3D printable files from segmented medical images. An example of a viewer and segmentation tool 122 is the IBM iConnect® Access. Medical images may include medical images of anatomies. An example of a medical image is a DICOM image.

The case management client application 124 provides portal functionality that allows the healthcare professional of the requester client computing device 116 to submit a 3D print request, transfer (e.g., upload, download) and view data, such as DICOM images and/or 3D printable files, and communicate with an application engineer user(s) regarding production requirements (e.g., messaging, video chatting, etc.). The 3D print request includes print data for an object to be 3D printed. The print data may include a description of the object to be 3D printed, printing specifications, requester information, patient information, shipping information, billing information, or a combination thereof 3D printable files may be STL files, 3MF files, or other files suitable for 3D printing.

In an embodiment, installation of application-specific client software (e.g., case management client application 124) is not required. For example, an embodiment may use a browser to communicate with a compatible HTTP server at a manager server computing device 108. For another example, an embodiment may use application programming interfaces (APIs) to allow the image viewer and segmentation tool 122 to exchange data with a case management server application at a manager server computing device 108 without leaving the image viewer and segmentation tool 122.

C. Reviewer Client Computing Device

A reviewer client computing device 128 of FIG. 1 may be implemented by any type of computing device. Example implementations of reviewer client computing device 128 include, without limitation, workstations, personal computers, laptop computers, tablet computers, personal digital assistants (PDAs), cellular telephony devices and any type of mobile devices.

Figure 2B:
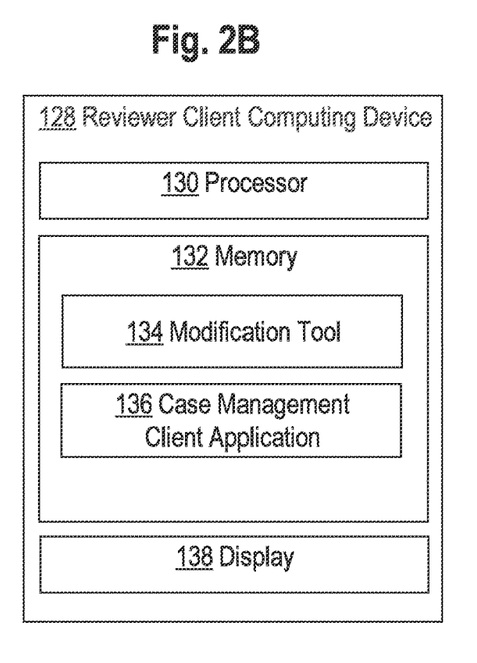
FIG. 2B depicts an example reviewer client computing device, according to an embodiment.

FIG. 2B depicts an example reviewer client computing device 128. The reviewer client computing device 128, operated by an application engineer user, includes a processor 130, memory 132 that includes a modification tool 134 and a case management client application 136 executed by the processor 130, and a display 138.

The modification tool 134 allows the application engineer user of the reviewer client computing device 128 to view and modify 3D printable files, which may be STL files, 3MF files, or other files suitable for 3D printing.

The case management client application 136 provides portal functionality that allows an application engineer professional of the reviewer client computing device 128 to transfer (e.g., upload, download) and view data, such as DICOM images and/or 3D printable files, communicate with a healthcare professional user(s) regarding production requirements (e.g., messaging, video chatting, etc.).

In an embodiment, installation of application-specific client software (e.g., case management client application 136) is not required. For example, an embodiment may use a browser to communicate with a compatible HTTP server at a manager server computing device 108. For another example, an embodiment may use application programming interfaces (APIs) to allow the modification tool 134 to exchange data with a case management server application at a manager server computing device 108 without leaving the modification tool 134.

E. Data Repository

A data repository 106 of FIG. 1 may include one or more databases. As used herein, the term "database" refers to a corpus of data, organized or unorganized, in any format, with or without a particular interface for accessing the corpus of data.

The data repository 106 may include an entity database. The entity database includes records of entities (e.g., healthcare professional users, healthcare organizations associated with healthcare professional users, application engineer users, engineering organizations associated with application engineer users, etc.). Each entity record may be created in response to an entity account setup (e.g., registration with a manager server computing device 108) and may contain contact information and authentication information for an entity.

The data repository 106 may include a case database. The case database includes records of cases. A case may refer to a medical matter or another type of matter. Each case record may be created in response to receiving a 3D print request submitted from a requester client computing device 116 and may contain print data, an initial version of a collection of one or more 3D printable files, any modified version of the collection of the one or more 3D printable files are stored in the data repository 106, quote data, invoice data, and other information relating to the request. Each case record of the case database may be associated with one or more entity records (e.g., record of requester and/or record of reviewer) of the entity database.

In an embodiment, the initial version of the collection of the one or more 3D printable files of the object may be provided at a requester client computing device 116, a reviewer client computing device 128, or a manager server computing device 108. Similarly, a modified version of the collection of the one or more 3D printable files of the object may be provided at a requester client computing device 116, a reviewer client computing device 128, or a manager server computing device 108.

The data repository 106 may include one or more other databases storing additional information that may be used by one or more components of the system 100. Databases may be co-located in a single data repository or may be separately located in different data repositories. Furthermore, although the data repository 106 is shown in FIG. 1 as a component separate from other components of FIG. 1., the data repository 106 may be part of another component, such as a manager server computing device 108.

E. Manager Server Computing Device

A manager server computing device 108 of FIG. 1 broadly represents one or more computers, such as one or more desktop computers, server computers, a server farm, a cloud computing platform (like Amazon EC2, Google Cloud, container orchestration (Kubernetes, Docker, etc.), or a parallel computer, virtual computing instances in public or private datacenters, and/or instances of a server-based application. In an embodiment, the manager server computing device 108 is in communication with one or more requester client computing devices 116, one or more data repositories 106, and one or more reviewer client computing devices 128.

Figure 2C:
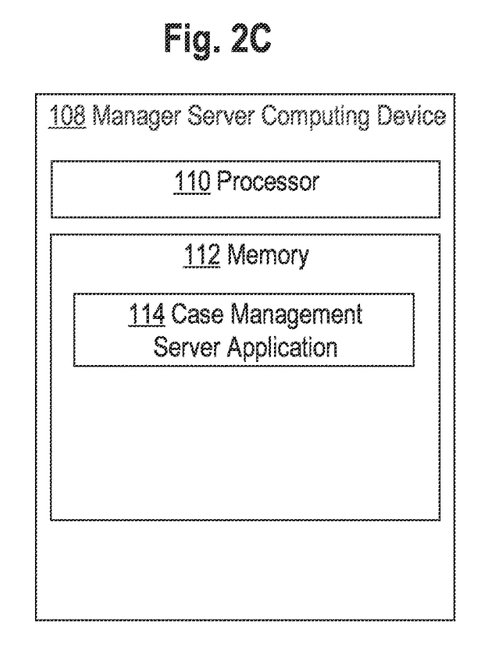
FIG. 2C depicts an example manager server computing device, according to an embodiment.

FIG. 2C depicts an example manager server computing device 108. The manager server computing device 108 includes a processor 110 and memory that includes a case management server application 114 executed by the processor 110. The case management client application 124, 136 executing on the client computing devices 116, 128 and the case management server application 114 executing on the manager server computing device 108 provide portal functionality that allows healthcare professional users and application engineer users to communicate with each other, to access and transfer data, etc., and version control functionality that allows healthcare professional users and application engineer users to access one or more versions of a collection of one or more 3D printable files.

The case management server application 114 of the manager server computing device 108 may be organized using a plurality of instructions, such as interfacing instructions, verification instructions, receiving and sending instructions, storing and retrieving instructions, alerting instructions, approving instructions, and performing instructions.

The interfacing instructions may be programmed to interface, using APIs, with one or more image viewer and segmentation tools 122, with one or more modification tools 134, and/or with one or more providers 104 to exchange data.

The verification instructions may be programmed to authenticate users of client computing devices 116, 128 (and by extension, client computing devices 116, 128) verifying authentication data (e.g., username/password) provided by the client computing devices 116, 128 against authentication information stored in the entity database.

The receiving and sending instructions may be programmed to transmit data with authenticated client computing devices 116, 128 and/or one or more providers 104. Example data being transmitted include messages between a requester client computing device 116 and a reviewer client computing devices 128, different versions of a collection of one or more 3D printable files, approval indications, alerts, notifications, etc.

The storing and retrieving instructions may be programmed to store data in and retrieve data from a data repository. For example, messages transmitted by client computing devices 116, 128 and different versions of a collection of one or more 3D printable files may be stored in the data repository 106 of FIG. 1.

The alerting instructions may be programmed to generate alerts, notifications, and emails to inform users of new data received. For example, an email may be generated and sent to a healthcare professional user informing the healthcare professional user that a new version of a collection of one or more 3D printable files is available for review. For another example, an email may be generated and sent to an application engineer user informing the application engineer user that feedback regarding the new version of the collection of one or more 3D printable files has been received.

The approving instructions may be programmed to "lock down" a particular version of the collection of one or more 3D printable files in response to receiving an approval indication for the particular version that has been approved by the healthcare professional user. The particular version may or may not be the latest version stored in the data repository 106. When the particular version is locked down, the particular version may be visually differentiated from other versions of the collection.

The performing instructions may be programmed to perform a plurality of tasks. Some of the plurality of tasks may be performed prior to the particular version being locked down, while others may be performed after the particular version of the collection is locked down.

An example task performed prior to the particular version being locked down is causing to generate a digital quote data. The digital quote data defines an electronic quote for 3D printing. The digital quote data may be transmitted to the requester client computing device 116, or to another computing device as specified in the print data, for approval prior to alerting the application engineer user of an initial version of the collection.

An example task performed after the particular version is locked down is causing to 3D print an object according to the particular version. Another example task performed after the particular version is locked down is causing to generate a digital invoice data. The digital invoice data defines an electronic payment invoice for the printed 3D object. The digital invoice data may be thereafter transmitted to the requester client computing device 116, or to another computing device as specified in the print data.

Other tasks are contemplated. In an embodiment one or more tasks may be completed by one or more providers 104 of FIG. 1. For example, 3D printing may be completed by a 3D printing service provider, or invoicing may be completed by an accounting service provider.

III. Example Event Flow

Figure 3A:
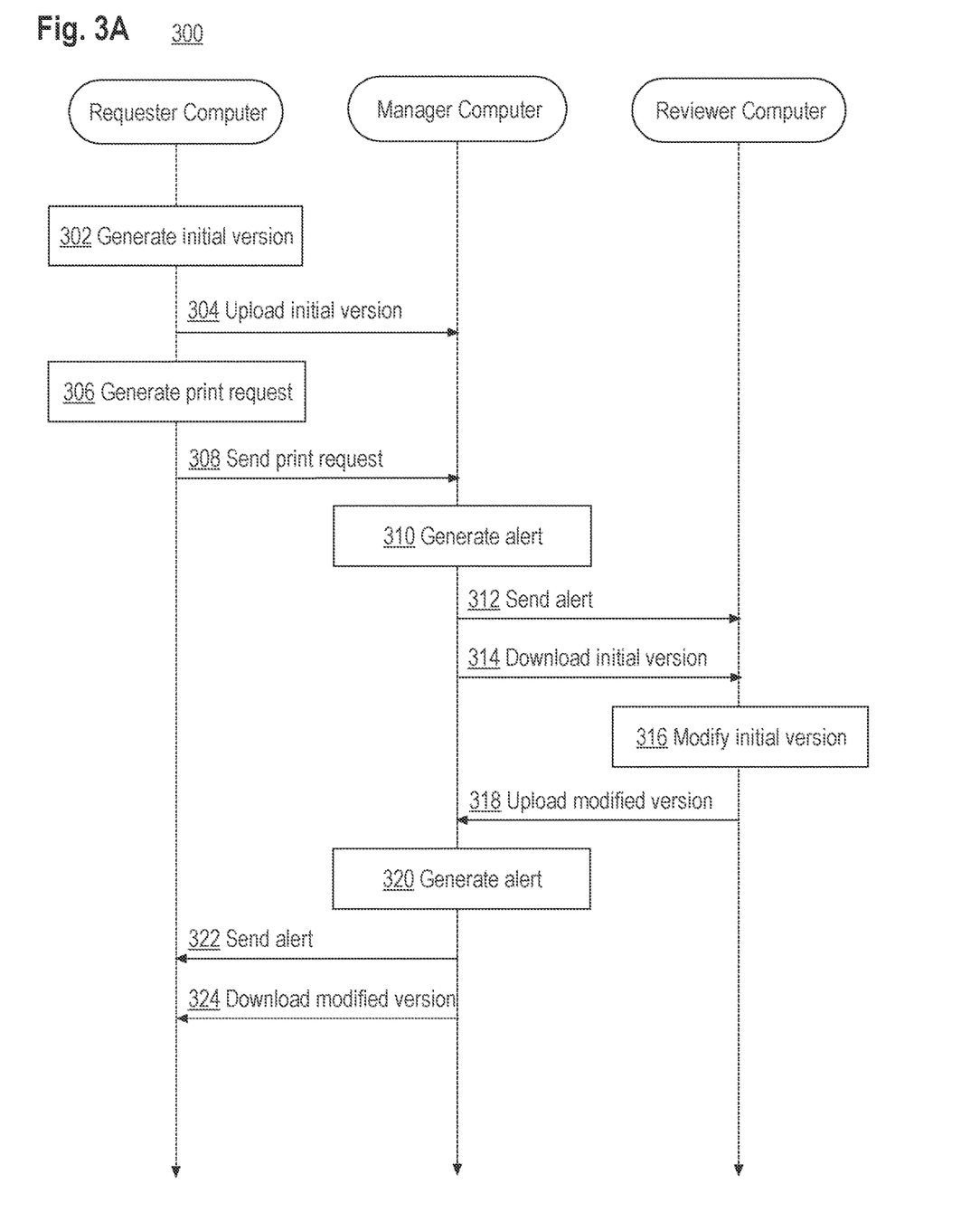
FIGS. 3A-3B depict an example event flow, according to an embodiment.
Figure 3B:
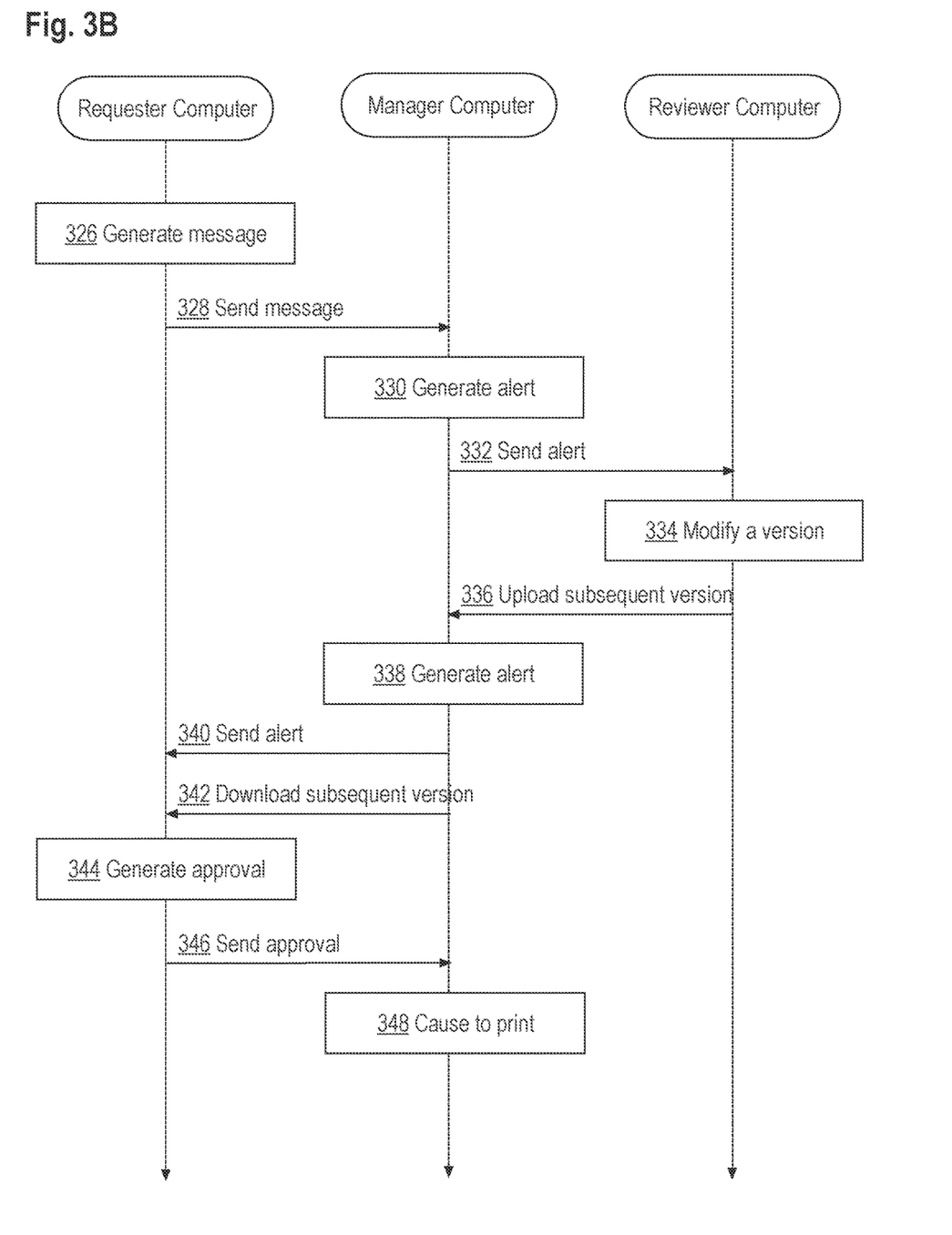

FIGS. 3A-3B depict an example event flow 300 within a networked computing system, such as the networked computing system 100 of FIG. 1. The event flow 300, starting in FIG. 3A and continuing in FIG. 3B, is between a requester computer, a manager computer, and a reviewer computer, to revise, review and approve 3D printable files. The requester computer may be similarly configured as a requester client computing device 116 of FIG. 1, the manager computer may be similarly configured as the manager server computing device 108 of FIG. 1, and the reviewer computer may be similarly configured as a reviewer client computing device 128 of FIG. 1. The manager computer may execute a case management server application. The requester computer may execute an image viewer and segmentation tool that interfaces with the case management server application through a set of APIs. The reviewer computer may execute a modification tool that interfaces with the case management server application through a set of APIs. Assume that the requester computer and the reviewer computer have been authenticated by the manager computer using authentication data provided by the requester computer and the reviewer computer.

At step 302, the requester computer generates an initial version of a collection of one or more 3D printable files. For example, a healthcare professional user of the requester computer may use the image viewer and segmentation tool to view and segment DICOM images and to generate 3D printable files from segmented DICOM images. The initial version of the collection may be stored locally by the requester computer.

At step 304, the initial version of the collection is uploaded to the manager computer. For example, the initial version of the collection is transmitted to the manager computer from the image viewer and segmentation tool. The initial version of the collection is stored by the manager computer in a data repository.

At step 306, the requester computer generates a 3D print request from the image viewer and segmentation tool. In an embodiment, the 3D print request includes print data for an object to be 3D printed. The print data includes description of the object to be 3D printed, printing specifications, requester information, patient information, shipping information, billing information, or a combination thereof.

At step 308, the 3D print request is sent to the manager computer. The print data of the 3D print request is stored by the manager computer in the data repository.

At step 310, the case management server application on the manager computer generates an alert indicating that new data has been received. For example, the alert informs an application engineer user of the reviewer computer of the initial version of the collection.

At step 312, the alert is sent, via the case management server application, to the reviewer computer.

At step 314, the initial version of the collection is downloaded to the reviewer computer. For example, the initial version of the collection is transmitted to the modification tool from the manager computer. The initial version of the collection may be stored locally by the reviewer computer.

At step 316, the reviewer computer modifies the initial version of the collection, generating a modified version of the collection of the one or more 3D printable files. For example, the application engineer user uses the modification tool to view and modify at least one of the one or more 3D printable files in the collection. An example modification may be to edit an orientation of a print to solve issues with overhangs during a printing process that may make the print fail. Another example modification may be remove unsupportable and/or unnecessary components. Yet another example modification may be to print disjoint components independently. The modified version of the collection may be stored locally by the reviewer computer.

At step 318, the modified version of the collection is uploaded to the manager computer. For example, the modified version of the collection is transmitted to the manager computer from the modification tool. The modified version of the collection is stored by the manager computer in the data repository.

At step 320, the case management server application on the manager computer generates an alert indicating that new data has been received. For example, the alert informs the healthcare professional user of the requester computer of the modified version of the collection.

At step 322, the alert is sent, via the case management server application, to the requester computer.

At step 324, the modified version of the collection is downloaded to the requester computer. For example, the modified version of the collection is transmitted to the image viewer and segmentation tool from the manager computer. The modified version of the collection may be stored locally by the requester computer.

The healthcare professional user reviews the modified version of the collection using, for example, the image viewer and segmentation tool on the requester computer. If the healthcare professional user has feedback (e.g., question, comment, suggestion, etc.) regarding the modified version of the collection, then the healthcare professional user may provide the feedback in a message, via the image viewer and segmentation tool, at step 326. At step 328, the message is sent to the manager computer. The feedback is stored by the manager computer in the data repository.

At step 330, the case management server application on the manager computer generates an alert indicating that new data has been received. For example, the alert informs the application engineer user of the reviewer computer of the message.

At step 332, the alert is sent, via the case management server application, to the reviewer computer.

At step 334, the reviewer computer generates another subsequent version of the collection of the one or more 3D printable files, according to the feedback. For example, the application engineer user uses the modification tool to view and modify at least one of the one or more 3D printable files in the collection. The subsequent version of the collection may be stored locally by the requester computer.

At step 336, the subsequent version of the collection is uploaded to the manager computer. For example, the subsequent version of the collection is transmitted to the manager computer from the modification tool. The subsequent version of the collection is stored by the manager computer in the data repository.

At step 338, the case management server application on the manager computer generates an alert indicating that new data has been received. For example, the alert informs the healthcare professional user of the requester computer of the subsequent version of the collection.

At step 340, the alert is sent, via the case management server application, to the requester computer.

At step 342, the subsequent version of the collection is downloaded to the requester computer. For example, the subsequent version of the collection is transmitted to the image viewer and segmentation tool from the manager computer. The subsequent version of the collection may be stored locally by the requester computer.

Steps 326-342 may be repeated until the healthcare professional user approves a version of the collection (e.g., feedback loop). When a particular version of the collection is finalized, the healthcare professional user may approve that version, via the image viewer and segmentation tool, at step 344. At step 346, the approval is sent to the manager computer.

At step 348, the manager computer causes to print a 3D object according to the approved version of the collection. For example, the manager computer may transmit the approved version of the collection to a 3D printer for printing. The manager computer may also causes other tasks, such as generating an invoice, to be performed. Tasks may be completed by one or more providers.

IV. Procedural Overview

Figure 4:
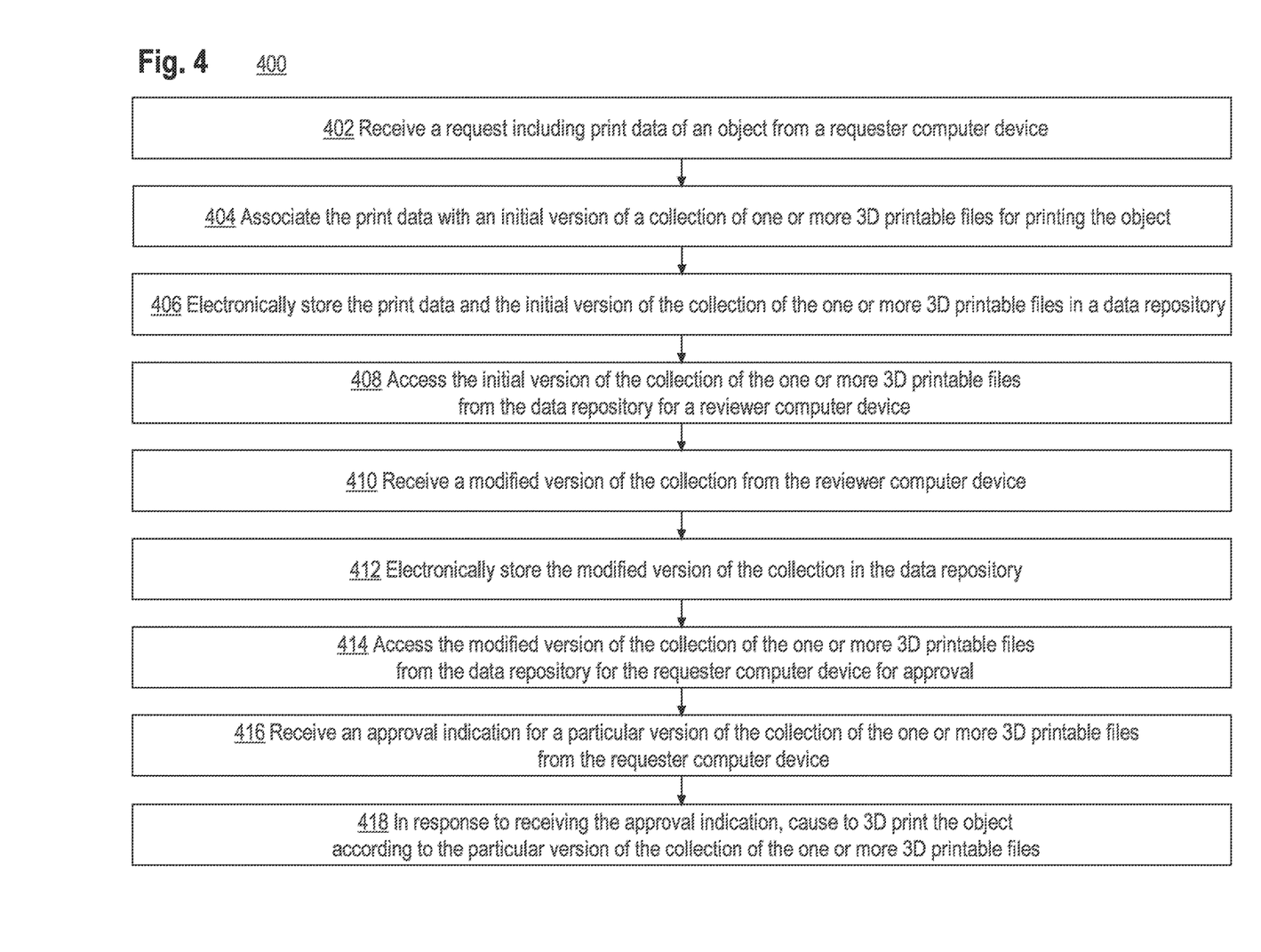
FIG. 4 depicts a method of producing a 3D object, according to an embodiment.

FIG. 4 depicts an example programmed algorithm 400 that may be used to implement an embodiment. For purposes of illustrating a clear example, FIG. 4 provides an overview of programmed functions that may be executed, in one embodiment, by components of FIG. 1 to facilitate revision, review and approval of 3D printable files. However, other implementations of FIG. 4 may be used with embodiments other than shown in FIG. 1. FIG. 4 and each other flow diagram in this disclosure are intended to schematically represent an algorithm, process, or procedure that may be programmed to implement the functions that are described, and are shown at the same level of detail that is customarily used by persons having ordinary skill in the art to which this disclosure pertains to communicate among themselves about how to architect, organize, program, and build computer program applications of the same class or type.

In step 402, a manager computer receives a request including print data of an object from a requester computer. For example, the managing server computing device 108 of FIG. 1 receives a 3D print request from a requester client computing device 116 of FIG. 1. The print data may include a description of an anatomical object (e.g., heart) to be 3D printed, printing specifications, requester information, patient information, shipping information, billing information, or a combination thereof.

In step 404, the manager computer associates the print data with an initial version of a collection of one or more 3D printable files for printing the object. The one or more 3D printable files in the initial version of the collection are generated from one or more medical segmentations (e.g., DICOM segmentations).

In an embodiment, the initial version of the collection of one or more 3D printable files is received from the requester computer. The request computer includes an image viewer and segmentation tool configured to view and segment medical images and to generate 3D printable files from segmented medical images. For example, the requester client computing device 116 may transmit the initial version of the collection, via the image viewer and segmentation tool, to the managing server computing device 108.

In an embodiment, the initial version of the collection of one or more 3D printable files is generated by the manager computer. For example, the managing server computing device 108 may include an image viewer and segmentation tool to view and segment medical images and to generate 3D printable files from segmented medical images.

In step 406, the manager computer electronically stores the print data and the initial version of the collection of the one or more 3D printable files in a data repository. For example, the manager server computing device 108 creates a new case record in the case database of the data repository 106. The case record includes the print data and the initial version of the collection. The case records may be associated with one or more entity records in the entity database of the data repository 106.

In an embodiment, after the 3D print request, the manager server computing device 108 generates and transmits a notification regarding the initial version of the collection to a reviewer client computing device 128 of FIG. 1.

In step 408, the manager computer accesses the initial version of the collection of the one or more 3D printable files from the data repository for a reviewer computer. For example, the manager server computing device 108 retrieves and transmits the initial version of the collection to the reviewer client computing device 128. The reviewer client computing device 128 includes a modification tool to view and modify 3D printable files.

In step 410, the manager computer receives a modified version of the collection from the reviewer computer, wherein the modified version of the collection differs from the initial version of the collection of the one or more 3D printable files. For example, the reviewer client computing device 128 transmits the modified version of the collection, via the modification tool, to the managing server computing device 108.

In step 412, the manager computer electronically stores the modified version of the collection in the data repository. For example, the manager server computing device 108 updates the case record to include the modified version of the collection.

In an embodiment, the manager server computing device 108 generates and transmits a notification regarding the modified version of the collection to the requester client computing device 116.

In step 414, the manager computer accesses the modified version of the collection of the one or more 3D printable files from the data repository for the requester computer for approval. For example, the manager server computing device 108 retrieves and transmits the modified version of the collection to the requester client computing device 116. The modified version of the collection may be viewed and reviewed via the image viewer and segmentation tool.

In step 416, the manager computer receives an approval indication for a particular version of the collection of the one or more 3D printable files from the requester computer, wherein the particular version of the collection is a version from a plurality of versions of the collection for printing the object that is electronically stored in the data repository. For example, once a version of the collection is finalized, the requester client computing device 116 generates and transmits an approval, via the image viewer and segmentation tool, to the managing server computing device 108 indicating the approved version of the collection.

In step 418, in response to receiving the approval indication, the manager computer causes to 3D print the object according to the particular version of the collection of the one or more 3D printable files. In some embodiments, the manager computer also causes to generate digital invoice data that defines an electronic payment invoice for the printed 3D object and/or digital invoice data that defines an electronic payment invoice for the printed 3D object. For example, the managing server computing device 108 causes to 3D print the heart according to the approved version of the collection. The managing server computing device 108 may send 3D printable files in the approved version to a 3D printing provider.

Embodiments described herein facilitate revision, review, and approval of 3D printable files prior to printing, in an efficient and cost-effective manner. The embodiments address the technical problem of how to eliminate or reduce repeated or needless reprinting that are otherwise required when 3D printable files are not accurate and optimized. Specific problems of prior practice have included wasteful use of computer processing resources, such as CPU usage and memory, as well as network bandwidth. The solutions disclosed herein can improve identification of changes to 3D printable files to increase accuracy and optimization of the 3D printable files, which in turn decrease the excessive use of computer processing resources and network bandwidth. Consequently, the embodiments provide numerous technical benefits.

V. Implementation Examples

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that are persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
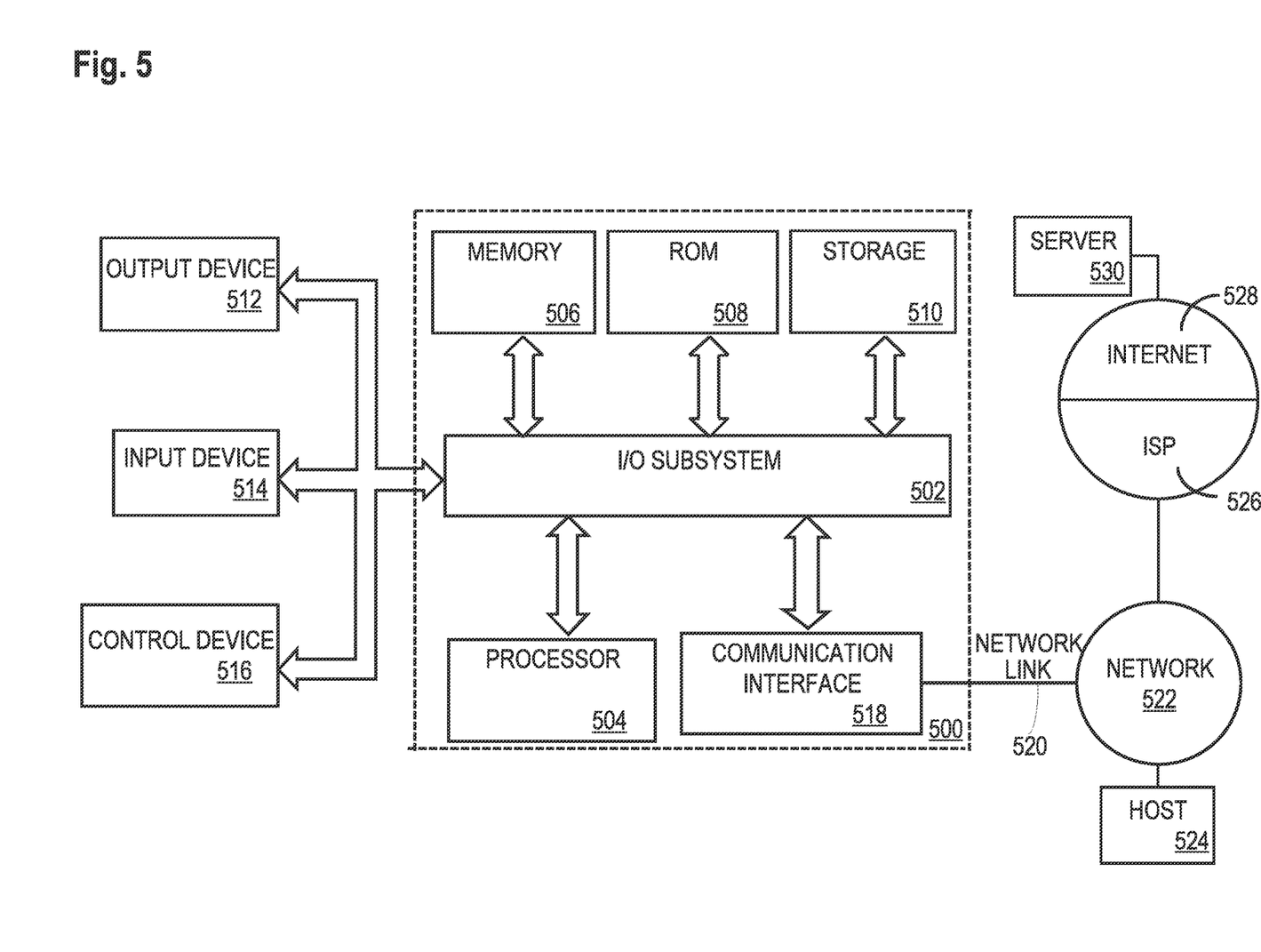
FIG. 5 depicts a block diagram of a computer system on which embodiments may be implemented.

FIG. 5 is a block diagram that depicts an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork, or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or Bluetooth technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A method comprising:

interacting with an image viewer and segmentation tool executing in a requester computer via an API of the image viewer and segmentation tool to receive, by a manager computer, a request including print data of an object from the requester computer that is separate from the manager computer;

associating, by the manager computer, the print data with an initial version of one or more 3D printable data for printing the object;

electronically storing, by the manager computer, the print data and the initial version of the 3D printable data in a data repository;

interacting with a modification tool executing in a reviewer computer via an API of the modification tool to transmit, by the manager computer over a network, the initial version of the 3D printable data from the data repository to the reviewer computer for modification by the reviewer computer, wherein the reviewer computer is separate from the manager computer and the requester computer;

interacting, via an application programming interface (API), with the modification tool executing in the reviewer computer via the API of the modification tool, to receive, by the manager computer, a modified version of the 3D printable data from the reviewer computer, wherein the modified version of the 3D printable data differs from the initial version of the 3D printable data, the modified version of the 3D printable data comprising one or more modifications to the initial version of the 3D printable data made by the reviewer computer;

electronically storing, by the manager computer, the modified version of the 3D printable data in the data repository;

interacting with the image viewer and segmentation tool via the API of the image viewer and segmentation tool to transmit, by the manager computer over the network, the modified version of the 3D printable data from the data repository to the requester computer for approval;

interacting with the image viewer and segmentation tool via the API of the image viewer and segmentation tool to receive, by the manager computer, an approval indication for a particular version of the 3D printable data from the requester computer, wherein the particular version of the 3D printable data is a version from a plurality of versions of the 3D printable data for printing the object that is electronically stored in the data repository, wherein the plurality of versions of the 3D printable data comprise the modified version of the 3D printable data;

in response to receiving the approval indication, causing to 3D print the object according to the particular version of the one or more 3D printable data.

2. The method of claim 1, wherein the initial version of the 3D printable data is generated from one or more DICOM segmentations.

3. The method of claim 1, wherein the initial version of the 3D printable data is received from the requester computer, wherein the requester computer includes an image viewer and segmentation tool.

4. The method of claim 1, wherein the initial version of the 3D printable data is generated by the manager computer.

5. The method of claim 1, further comprising generating, by the manager computer, a notification regarding the modified version of the 3D printable data.

6. The method of claim 1, further comprising causing to generate digital quote data that defines an electronic quote for printing the object.

7. The method of claim 1, wherein receiving, by the manager computer, the request including the print data of the object from the requester computer comprises interfacing with an API of a segmentation tool executing in the requester computer.

8. An apparatus comprising:

a manager computer;

one or more processors; and one or more memories communicatively coupled to the one or more processors and storing instructions which, when processed by the one or more processors, cause:

interacting with an image viewer and segmentation tool executing in a requester computer via an API of the image viewer and segmentation tool to receive, by a manager computer, a request including print data of an object from the requester computer that is separate from the manager computer;

associating, by the manager computer, the print data with an initial version of 3D printable data for printing the object;

electronically storing, by the manager computer, the print data and the initial version of the 3D printable data in a data repository;

interacting with a modification tool executing in a reviewer computer via an API of the modification tool to transmit, by the manager computer over a network, the initial version of the 3D printable data from the data repository to the reviewer computer for modification by the reviewer computer, wherein the reviewer computer is separate from the manager computer and the requester computer;

interfacing with an application programming interface (API) of a modification tool executing in the reviewer computer interacting with the modification via the API of the modification tool to receive, by the manager computer, a modified version of the 3D printable data from the reviewer computer, wherein the modified version of the 3D printable data differs from the initial version of the 3D printable data, the modified version of the 3D printable data comprising one or more modifications to the initial version of the 3D printable data made by the reviewer computer;

electronically storing, by the manager computer, the modified version of the 3D printable data in the data repository;

interacting with the image viewer and segmentation tool via the API of the image viewer and segmentation tool to transmitting transmit, by the manager computer over the network, the modified version of the 3D printable data from the data repository to the requester computer for approval;

interacting with the image viewer and segmentation tool via the API of the image viewer and segmentation tool to receiving receive, by the manager computer, an approval indication for a particular version of the 3D printable data from the requester computer, wherein the particular version of the 3D printable data is a version from a plurality of versions of the 3D printable data for printing the object that is electronically stored in the data repository, wherein the plurality of versions of the 3D printable data comprise the modified version of the 3D printable data; and in response to receiving the approval indication, causing to 3D print the object according to the particular version of the 3D printable data.

9. The apparatus of claim 8, wherein the initial version of the 3D printable data is generated from one or more DICOM segmentations.

10. The apparatus of claim 8, wherein the initial version of the 3D printable data is received from the requester computer, wherein the requester computer includes an image viewer and segmentation tool.

11. The apparatus of claim 8, wherein the initial version of the 3D printable data is generated by the manager computer.

12. The apparatus of claim 8, wherein the print data includes printing specifications for printing the object.

13. The apparatus of claim 8, wherein the instructions which, when processed by the one or more processors, further cause generating, by the manager computer, a notification regarding the modified version of the 3D printable data.

14. The apparatus of claim 8, wherein the instructions which, when processed by the one or more processors, further cause causing to generate digital quote data that defines an electronic quote for printing the object.

15. One or more non-transitory computer-readable media storing instructions which, when processed by one or more processors, cause:

interacting with an image viewer and segmentation tool executing in a requester computer via an API of the image viewer and segmentation tool to receive, by a manager computer, a request including print data of an object from the requester computer that is separate from the manager computer;

associating, by the manager computer, the print data with an initial version of 3D printable data for printing the object;

electronically storing, by the manager computer, the print data and the initial version of the 3D printable data in a data repository;

interacting with a modification tool executing in a reviewer computer via an API of the modification tool to transmitting transmit, by the manager computer over a network, the initial version of the 3D printable data from the data repository to a reviewer computer for modification by the reviewer computer, wherein the reviewer computer is separate from the manager computer and the requester computer;

interfacing with an application programming interface (API) of a modification tool executing in the reviewer computer to interacting with the modification via the API of the modification tool to receive, by the manager computer, a modified version of the 3D printable data from the reviewer computer, wherein the modified version of the 3D printable data differs from the initial version of the 3D printable data, the modified version of the 3D printable data comprising one or more modifications to the initial version of the 3D printable data made by the reviewer computer;

electronically storing, by the manager computer, the modified version of the 3D printable data in the data repository;

interacting with the image viewer and segmentation tool via the API of the image viewer and segmentation tool to transmit, by the manager computer over the network, the modified version of the 3D printable data from the data repository to the requester computer for approval;

interacting with the image viewer and segmentation tool via the API of the image viewer and segmentation tool to receiving receive, by the manager computer, an approval indication for a particular version of the 3D printable data from the requester computer, wherein the particular version of the 3D printable data is a version from a plurality of versions of the 3D printable data for printing the object that is electronically stored in the data repository, wherein the plurality of versions of the 3D printable data comprise the modified version of the 3D printable data; and in response to receiving the approval indication, causing to 3D print the object according to the particular version of the 3D printable data.

16. The one or more non-transitory computer-readable media of claim 15, wherein the initial version of the 3D printable data is generated from one or more DICOM segmentations.

17. The one or more non-transitory computer-readable media of claim 15, wherein the initial version of the 3D printable data is received from the requester computer, wherein the requester computer includes an image viewer and segmentation tool.

18. The one or more non-transitory computer-readable media of claim 15, wherein the print data includes printing specifications for printing the object.

19. The one or more non-transitory computer-readable media of claim 15, wherein the instructions which, when processed by the one or more processors, further cause generating, by the manager computer, a notification regarding the modified version of the 3D printable data.

20. The one or more non-transitory computer-readable media of claim 15, wherein the instructions which, when processed by the one or more processors, further cause causing to generate digital quote data that defines an electronic quote for printing the object.

* * * * *